April 20, 1965     Z. J. LANSKY ETAL     3,179,444
QUICK ATTACHMENT DEVICE

Filed May 19, 1961     3 Sheets-Sheet 1

INVENTORS
ZDENEK J. LANSKY
BY   GILBERT RISKE

John N. Wolfram
ATTORNEY

April 20, 1965    Z. J. LANSKY ETAL    3,179,444
QUICK ATTACHMENT DEVICE

Filed May 19, 1961    3 Sheets-Sheet 2

INVENTORS
ZDENEK J. LANSKY
BY  GILBERT RISKE

John N. Wolfram
ATTORNEY

April 20, 1965

Z. J. LANSKY ETAL 3,179,444

QUICK ATTACHMENT DEVICE

Filed May 19, 1961

INVENTORS
ZDENEK J. LANSKY
BY GILBERT RISKE

John N. Wolfram
ATTORNEY

United States Patent Office 3,179,444
Patented Apr. 20, 1965

3,179,444
QUICK ATTACHMENT DEVICE
Zdenek J. Lansky, North Riverside, and Gilbert Riske, Lombard, Ill., assignors to Parker-Hannifin Corporation, Cleveland, Ohio, a corporation of Ohio
Filed May 19, 1961, Ser. No. 120,831
11 Claims. (Cl. 285—87)

This invention relates to a quick attachment device for connecting and disconnecting a pair of members and more particularly to such a device which is suitable for attaching an oil reservoir bowl to the body of an airline lubricator or an airline filter whereby the bowl may be quickly assembled or disassembled from the same.

It is an object of the invention to provide a quick attachment device usable for attaching a plastic bowl to the body of air airline filter or airline lubricator in which the bowl and body may be brought into sealed relation and attached to each other without effecting relative rotation therebetween while the attachment is being made.

It is another object to provide a quick attachment device usable for attaching a bowl to a body in which the body and a collar rotatable on the bowl have interfitting circumferentially spaced lugs and recesses and the body carries a lock ring with corresponding lugs and recesses, such lock ring being rotatable from one position where its lugs and recesses are in alignment with the lugs and recesses of the body to permit the collar to be attached to or detached from the body to another position in which the lugs on the lock ring overlie the lugs on the collar so as to prevent detachment of the collar from the body, and with means for latching the lock ring in the latter position.

It is another object to provide a quick attachment device of the type described in which the latch for the lock ring is carried by the lock ring and is spring biased to a position in which it abuts a shoulder on the collar to prevent relative rotation between the lock ring and collar.

It is another object to provide a quick attachment device of the type described in which the lock ring is conveniently formed of two sections assembled into a groove in the body in such a manner that accidental displacement from the groove is prevented.

It is another object to provide a quick attachment device in which the interfitting lugs and recesses on the body and collar are uniformly circumferentially spaced whereby the body and collar may be assembled in various rotative positions with respect to each other, the collar contains a lateral slot through which a tongue for rotating the lock ring extends, and the lock ring is rotatable on the body through an arc of 360° whereby the tongue may be rotated into alignment with the slot regardless of the relative rotative position of the collar upon the body.

Other objects of the invention will be apparent from the description and from the drawings in which.

Figure 1:
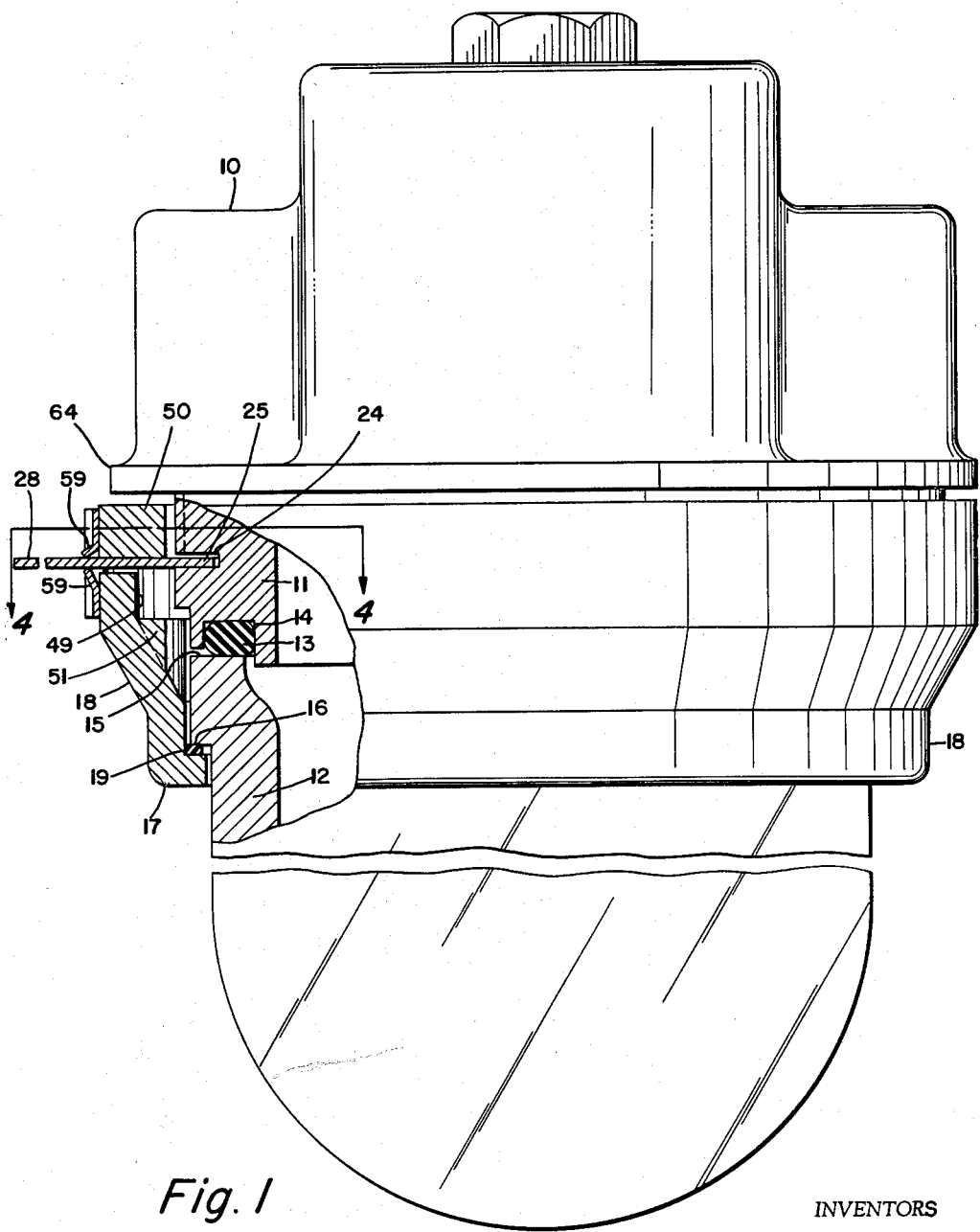
FIG. 1 is a partial cross section through an airline lubricator, the sectional portion being taken along the lines 1—1 of FIG. 4.

The drawings illustrate the invention as applied to a conventional airline lubricator of the general type, for example, illustrated in Endebak et al. Patent 2,889,009, issued June 2, 1959. The lubricator includes a body 10 having an annular depending portion 11 to which an oil reservoir or bowl 12 is to be sealingly attached, the seal being effected by means of a resilient packing ring 13 carried in a groove 14 in the body and engageable with an upper flat surface 15 on the bowl.

The bowl has an annular shoulder 16 which is opposite an inturned flange 17 on a collar 18. Preferably, a thin ring 19 of flexible material is interposed between shoulder 16 and flange 17. In some forms of the invention bowl 12, as for example when made of metal, may be integral with collar 18.

Annular portion 11 of the body is formed with a series of equally spaced longitudinally extending external lugs 22 with recesses 23 therebetween. Intermediate the ends of the lugs and recesses is an annular groove 24 in which a lock ring 25 is mounted for rotation through an arc of 360°.

Lock ring 25 has lugs 26 corresponding to lugs 22 and recesses 27 corresponding to recesses 23. On one of the lugs 26 there is a tongue 28 by means of which lock ring 25 may be rotated.

Lock ring 25 is preferably formed of two semi-circular sections 30, 31. Section 30 has tongues 32, 33 and grooves 34, 35 for interlocking engagement with tongues 36, 37 and grooves 38, 39 on section 31. Sections 30, 31 are provided with holes 40, 41.

Figure 6:
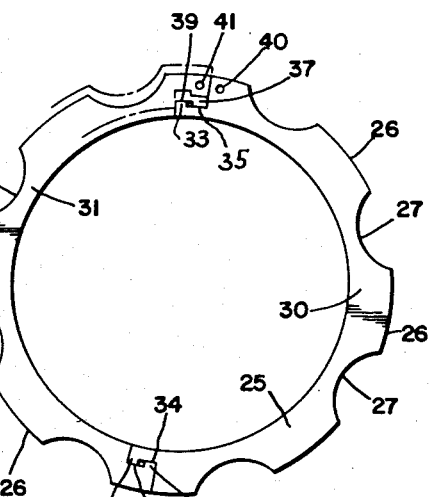
FIG. 6 is a plan view of the lock ring.
Figure 5:
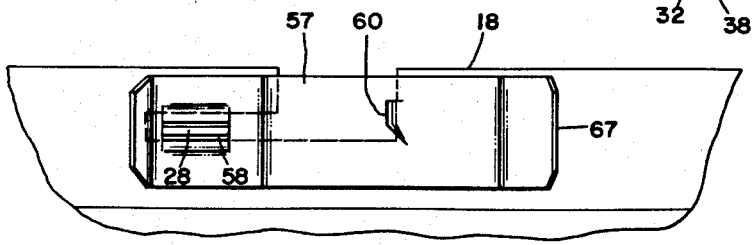
FIG. 5 is a partial view along the lines 5—5 of FIG. 4.
Figure 7:
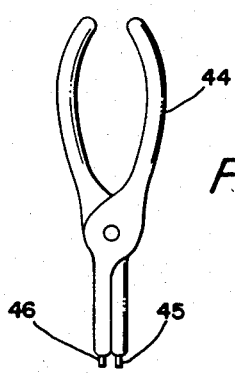
FIG. 7 shows a tool for assembling the lock ring into its groove in the lubricator body.

To assemble lock ring 25 into groove 24, sections 30, 31 are placed within the groove with tongues and grooves 32, 34, 36 and 38 interlocked and with the diametrically opposite edges of sections 30 and 31 adjacent each other. A plier type assembly tool 44 is then placed with one tip 45 within hole 40 and the other tip 46 within hole 41. The plier is then rotated about tip 45 so as to spring the adjacent end of lock ring section 31 radially outward to the dotted position shown in FIG. 6 whereby tongue 37 will clear tongue 33 whereby section 31 may spring back to the full line position shown in FIG. 6 with tongues and grooves 33, 35, 37 and 39 interlocked as shown. Tool 44 may likewise be used for disassembling lock ring 25 from body 11.

Collar 18 also has a series of spaced circumferential internal lugs 48 with recesses 47 therebetween. Lugs 48 are divided by means of slots 49 into upper and lower portions 50 and 51. A transverse slot 53 extends downwardly from the upper end of the collar and merges with an undercut portion 54.

Mounted on tongue 28 of lock ring 25 is a clip 57. This clip has an opening 58 formed by bending tabs 59 outwardly for receiving tongue 28. Tabs 59 grip the tongue with spring tension for effectively retaining clip 57 upon the tongue.

Clip 57 has another tab 60 which is inwardly directed for engaging sidewall 61 of slot 53 when tongue 28 is rotated to a position within recess 54. In this position, lugs 26 on lock ring 25 are out of register with lugs 22 of body 10 and are within slots 49 so as to be in the path of lugs 48.

Clip 57 is so formed that when in position on tab 28 it provides spring tension for retaining tab 60 within slot 53. An outwardly turned tab 67 provides a finger grip by means of which clip 57 may be sprung outwardly to disengage tab 60 from slot 53.

Figure 2:
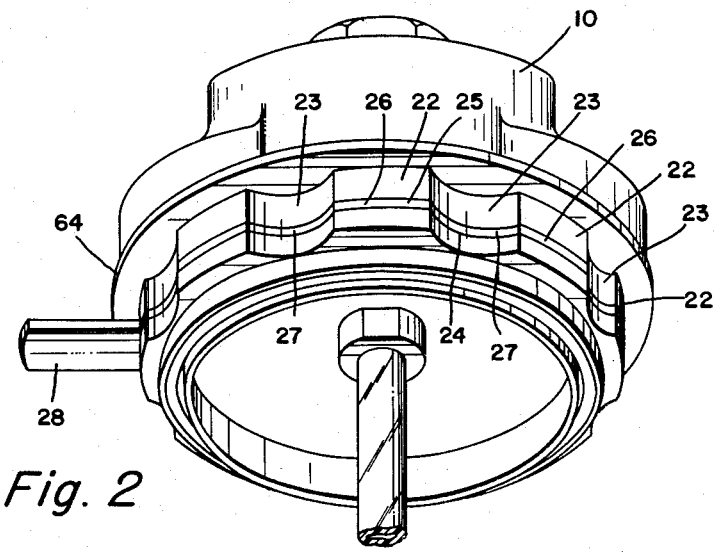
FIG. 2 is a perspective view of the lubricator body.
Figure 3:
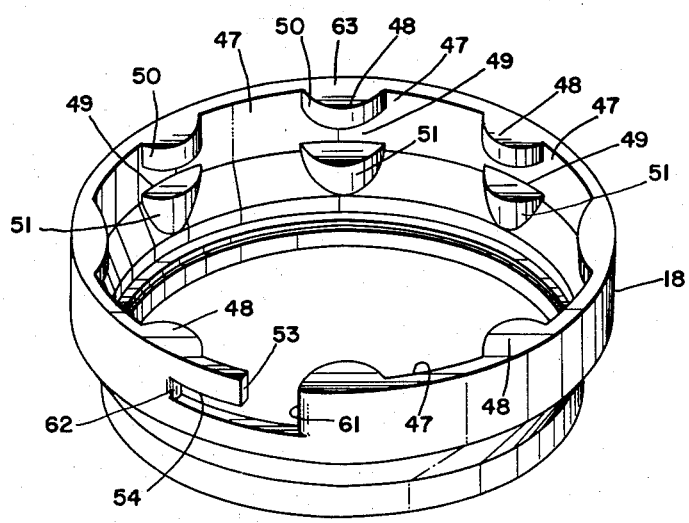
FIG. 3 is a perspective view of a collar by means of which a bowl may be attached to the body.

To attach bowl 12 to body 10, washer 16 and collar 18 are slipped over bowl 12 with flange 17 adjacent bowl shoulder 16. Lock ring 25 is then rotated to any desired angular position on body 10 by means of tongue 28 with lugs 26 of the lock ring in register with body lugs 22, as shown in FIG. 2. The collar and bowl are then brought into position below the body with collar lugs 48 aligned with body recesses 23 and with slot 53 aligned with tongue 28. The collar is then moved upward until upper surface 63 is adjacent the lower side of flange 64 on body 10. In the latter position the body and collar lugs and recesses are interlocked so as to prevent relative rotation between the collar and body. Also, upper surface 15 of bowl 12 is sealingly engaged with resilient packing member 13 to deform the latter and seal the joint between the bowl and body.

Figure 4:
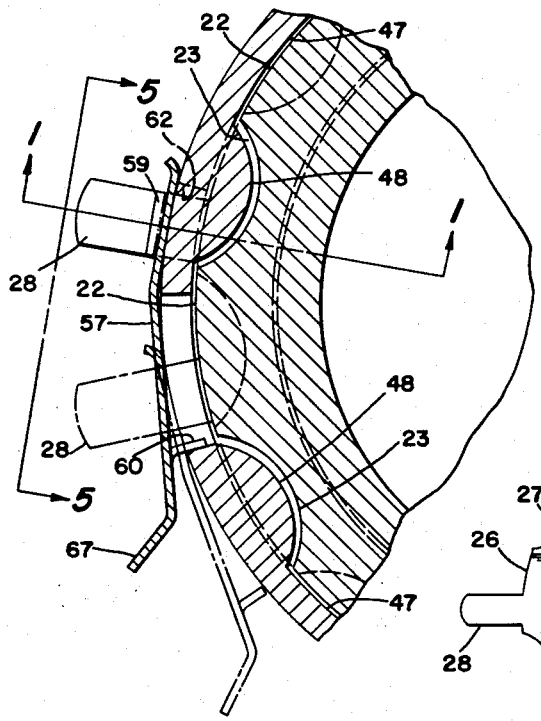
FIG. 4 is a partial view in cross section along the lines 4—4 of FIG. 1.

Meanwhile, tongue 28 is in vertical register with recess 54 and may now be used for rotating lock ring 25 from its unlocked position shown by the dotted line in FIG. 4 to its lock position shown by the full line.

Upon such rotation of lock ring 25, lugs 26 on the lock ring pass under collar lug sections 50 to prevent withdrawal of the collar from body 10 and tab 60 snaps into slot 53 to engage sidewall 61 to latch the lock ring so that it cannot be accidentally rotated back to its unlock position. Tongue 28 is engageable with side face or shoulder 62 of recess 54 to limit rotation of locking ring 25 in the locking direction.

To remove the bowl and collar from body 10, clip 57 is deflected outwardly by means of tab 67 until tab 60 is withdrawn from slot 53. Lock ring 25 may then be rotated by means of tab 28 to its unlock position with tab 28 in the dotted position shown in FIG. 4 where it is in register with slot 53. At this time, lugs 26 on the lock ring are again in register with lugs 22 of the body and hence with recesses 47 of the collar. The collar may then be moved downwardly to separate it from the body.

Although the quick attachment mechanism of the present invention has been illustrated and described in connection with an air line lubricator, it is apparent that it may be used in connection with airline filters, as for example of the general type shown in Carlstedt Patent 2,786,643, issued March 26, 1957, as well as with other devices having members to be joined. Also, it is apparent that various modifications can be made in the detail design without departing from the inventive concepts defined by the claims.

We claim:

1. An attachment device comprising first and second members, said first member having circumferentially spaced axially extending radially outward directed external lugs with recesses therebetween said second member having circumferentially spaced axially extending radially inwardly directed internal lugs with recesses therebetween, said first member being telescoped within said second member with the lugs on each member received in the recesses of the other member whereby said members are non-rotatable with respect to each other, a third member rotatably attached to one of said members and having lugs and recesses corresponding with the lugs and recesses of said first and second members, said third member being rotatable to a position so that its lugs overlie the lugs of said other member to prevent separation of said members in at least one axial direction, latching means forming immovable portions of said second and third members for locking said third member in said position, said latching means including a member defining one of said immovable portions carried by said third member and externally of said first and second members and normally spring biased into engagement with an abutment on said second member defining another of said immovable portions for preventing rotation of said third member out of said position.

2. A quick attachment device in accordance with claim 1 in which there is a flange in said first member overlying said lugs and recesses at one end thereof to protect against entrance of foreign matter between said lugs and recesses.

3. A quick attachment device in accordance with claim 1 in which said third member comprises a pair of semicircular sections having interlocking engagement with each other.

4. A quick attachment device in accordance with claim 3 in which at least one of said sections is resiliently yieldable whereby the same may be sprung into and out of such interlocking engagement.

5. A quick attachment device in accordance with claim 3 in which means are provided on said sections whereby the same may be gripped by a tool for springing the same into and out of said interlocking engagement.

6. A quick attachment device in accordance with claim 3 in which said third member has a radially extending tongue by means of which said third member may be rotated, and in which said tongue is engageable with a first shoulder on one of said members to limit rotation of said third member in one direction from said lock position and is engageable with a second shoulder on one of said members to limit rotation of said third member in the opposite direction from said lock position.

7. A quick attachment device in accordance with claim 1 in which said second member engages a fourth member for clamping the same into engagement with said first member.

8. A quick attachment device in accordance with claim 7 in which there is a resilient packing engaged by said first and fourth members and providing a seal therebetween.

9. A quick attachment device comprising first and second members, said first member having a circular portion with circumferentially spaced axially extending external lugs with recesses therebetween, said second member having a circular portion with circumferentially spaced and axially extending internal lugs with recesses therebetween, said first member being telescoped within said second member with the lugs on each member received in the recesses of the other member whereby said members are non-rotatable with respect to each other, a circumferential groove in said first member in which a third member is confined against axial displacement from said first member, said third member having lugs and recesses corresponding to those of said first member, said third member being rotatable to a position in which the lugs thereon overlie the lugs on said second member to lock said second member onto said first member, said second member having a slot therein open to one end thereof, a tongue on said third member projecting through said slot and accessible for rotating said third member, said lugs and recesses being uniformly circumferentially spaced whereby said second member may be telescoped over said first member in selected rotative positions with respect thereto, said third member being rotatable through an arc of 360° on said first member whereby it may be rotated into registry with said slot prior to telescoping of said first member with said second member regardless of the rotative position of said second member with respect to said first member, latching means forming immovable portions of said second and third members for locking said third member in the position in which the lugs thereof overlie the lugs on said second member to lock said second member onto said first member, said latching means including a member defining one of said immovable portions carried by said tongue externally of said first and second members and normally spring biased into engagement with another of said immovable portions, said last mentioned immovable portion being an abutment on the second member defined by said slot whereby abutting engagement between the member carried by said tongue and said abutment prevents rotation of said third member and disengagement of said first and second members.

10. A quick attachment device in accordance with claim 9 in which said latch member is resiliently yieldable for withdrawing said portion from said slot whereby said third member may be moved to an unlock position with its lugs and recesses in axial alignment with the lugs and recesses on said first member whereby said first and second members may be separated.

11. A quick attachment device in accordance with claim 9 in which said circumferential groove is intermediate the ends of the lugs on said first member and the lugs on said second member are grooved intermediate their ends for receiving the lugs on said third member.

References Cited by the Examiner
UNITED STATES PATENTS

| | | | |
|---|---|---|---|
| 76,622 | 4/68 | Gaines | 285—377 |
| 981,866 | 1/11 | Lockhard | 285—87 |
| 2,472,586 | 6/49 | Harvey. | |
| 2,784,011 | 3/57 | Roberts | 285—308 |

FOREIGN PATENTS

| | | |
|---|---|---|
| 975,991 | 10/50 | France. |
| 525,184 | 4/31 | Germany. |

References Cited by the Applicant
UNITED STATES PATENTS

| | | |
|---|---|---|
| 1,915,014 | 6/33 | Carter. |
| 3,120,402 | 2/64 | Wallen. |

CARL W. TOMLIN, *Primary Examiner.*